US006145308A

United States Patent [19]

Bueche et al.

[11] Patent Number: 6,145,308

[45] Date of Patent: Nov. 14, 2000

[54] AIR TURBINE WITH POWER CONTROLLER HAVING OPERATION INDEPENDENT OF TEMPERATURE

[75] Inventors: Gerard H. Bueche, Byron; Mark Reinecke, Machesney Park, both of Ill.

[73] Assignee: Hamilton Sundstrand Corporation, Rockford, Ill.

[21] Appl. No.: 09/217,815

[22] Filed: Dec. 22, 1998

[51] Int. Cl.[7] ..................... F16D 31/02

[52] U.S. Cl. ..................... 60/398; 60/449; 60/452; 60/487

[58] Field of Search ..................... 416/142; 60/445, 60/449, 450, 452, 398, 487

[56] References Cited

U.S. PATENT DOCUMENTS

| | | | |
|---|---|---|---|
| 2,402,789 | 6/1946 | Tweedale | 60/398 X |
| 3,269,121 | 8/1966 | Bening | 60/398 |
| 3,277,708 | 10/1966 | Reynolds et al. | 73/861.61 |
| 3,563,675 | 2/1971 | Straznickas . | |
| 3,951,161 | 4/1976 | Rohrback et al. . | |
| 3,996,124 | 12/1976 | Eaton et al. . | |
| 4,149,092 | 4/1979 | Cros | 60/398 X |
| 4,160,948 | 7/1979 | Tytgat et al. . | |
| 4,256,542 | 3/1981 | Tytgat et al. . | |
| 4,299,198 | 11/1981 | Woodhull | 60/398 X |
| 4,321,941 | 3/1982 | Hunschede . | |
| 4,426,618 | 1/1984 | Ronchetti . | |
| 4,447,738 | 5/1984 | Allison | 60/398 X |
| 4,503,673 | 3/1985 | Schachle et al. | 60/398 X |
| 4,680,931 | 7/1987 | Jacobs . | |
| 4,711,616 | 12/1987 | Tsukahara et al. . | |
| 4,717,095 | 1/1988 | Cohen et al. . | |
| 4,742,976 | 5/1988 | Cohen . | |
| 4,785,849 | 11/1988 | Masuda . | |
| 5,064,351 | 11/1991 | Hamey . | |
| 5,122,036 | 6/1992 | Dickes et al. | 417/222.1 |
| 5,145,324 | 9/1992 | Dickes et al. | 60/452 X |
| 5,320,499 | 6/1994 | Hamey et al. . | |
| 5,334,303 | 8/1994 | Muramatsu et al. . | |
| 5,421,705 | 6/1995 | Benckert . | |
| 5,722,459 | 3/1998 | Kim et al. . | |

FOREIGN PATENT DOCUMENTS

| | | |
|---|---|---|
| 0504730 | 9/1992 | European Pat. Off. . |
| 0676637 | 10/1995 | European Pat. Off. . |

*Primary Examiner*—John E. Ryznic
*Attorney, Agent, or Firm*—Antonelli Terry Stout & Kraus

[57] ABSTRACT

A fluid driven turbine for use in generating power by driving a load (32) with a fluid stream intercepting blades (12) of the turbine and the turbine applying power to the load during rotation of the blades in accordance with the invention includes a variable displacement hydraulic pump (19) which is driven by rotation of the blades, including a displacement control (57) having an element (62) which is responsive to a control signal for varying the displacement of the variable displacement hydraulic pump for producing a pressurized hydraulic fluid output to drive the load; and a hydraulic control valve (90) which generates the control signal in response to a hydraulic signal which is a function of speed changes of the blades and a pressure dropping orifice (114"), responsive to the hydraulic signal which is a function of speed changes of the blades which bleeds the hydraulic signal to a lower pressure, the orifice producing a coefficient of discharge of liquid independent of viscosity thereof; and wherein the control signal causes the element to vary displacement of the variable displacement pump which is a function of speed changes of the blades.

28 Claims, 8 Drawing Sheets

AIR TURBINE WITH POWER CONTROLLER HAVING OPERATION INDEPENDENT OF TEMPERATURE

CROSS REFERENCE TO RELATED APPLICATION

Reference is made to U.S. patent application Ser. No. 09/217,816, filed on even date herewith, entitled "Air Turbine With Stable Anti-Stall Control System and Method of Operation" which application is incorporated herein by reference in its entirety.

TECHNICAL FIELD

The present invention relates to fluid driven turbines and preferably to RAM air turbines used by airplanes for generating emergency power.

BACKGROUND ART

Hydraulic and electric power is generated in airplanes by power takeoffs from the propulsion engines during flight and/or an auxiliary power unit. Control of an airplane is dependent upon the generation of electrical and/or hydraulic power. In the event that the propulsion engines are rendered inoperative during flight and emergency power cannot be generated by the APU, control of the airplane may not be maintained without an emergency power source which generates its power from the movement of the airplane through the air.

FIG. 1 illustrates a block diagram of a prior art RAM air turbine described in the Assignee's U.S. Pat. Nos. 5,122,036 and 5,145,324 which patents are incorporated herein by reference in their entirety. The RAM air turbine 10 has a plurality of blades 12 which are mounted on a hub, not illustrated, which drives an output shaft 14. The RAM air turbine 40 has a governor 16 which adjusts the pitch of the blades 12 to maintain operation within a first rotational velocity range which typically varies from 5,250 rpms and upward. The governor 16 usually contains a pitch control mechanism which varies the pitch from coarse to fine to provide increased power generation in response to increased demand for power from the hydraulic load while regulating speed within the first rotational velocity range as discussed above. Once the pitch of the blades 12 has been adjusted to its finest setting by the pitch adjustment mechanism of the governor 16, increased demand for power by the hydraulic load leads to stalling with the generated power output immediately dropping to zero. Hydraulic pump 14 produces high pressure hydraulic fluid 20 which was applied to a hydraulic load 32 such as a hydraulic motor and/or actuators. When applied to a hydraulic motor, the hydraulic motor is typically used to drive an electrical power generator for producing emergency electrical power. When applied to hydraulic actuators, hydraulically controlled elements, such as wing flaps are activated.

As illustrated, the RAM air turbine 30 is in the deployed position in which it has been pivoted from a stowed position in the fuselage identified schematically by reference numeral 33 to the deployed position as illustrated to intercept air on the blades 12 produced by motion of the airplane to cause rotation of the blades. It should be understood that the actual stowed and deployed positions are as illustrated in the assignee's commonly assigned U.S. Pat. Nos. 4,717,095 and 4,742,976 which are incorporated herein by reference in their entirety. The pivoting mechanism for moving RAM air turbines between the stowed and deployed positions may be in accordance with the pivoting mechanism of U.S. Pat. Nos. 4,717,095 and 4,742,976.

The velocity of the airplane in moving through the air produces the RAM AIRSTREAM. The variable displacement hydraulic pump 19 functions to produce pressurized hydraulic fluid 20 which is applied to a hydraulic load 32. The hydraulic load 32 may be any hydraulic load utilized in an airplane such as, but not limited to, a hydraulic actuator for moving of flight control surfaces or a hydraulic motor which is driven by the pressurized hydraulic fluid 20 to drive a load 36 which may be an electrical generator for generating emergency electrical power.

The operational characteristic of the RAM air turbine 30 generates hydraulic power for a second rotational velocity range of the blades 12 below which the governor 16 cannot prevent stalling from occurring. The variable displacement hydraulic pump 19 produces a constant power output of hydraulic fluid 20 varying in pressure in the second rotational velocity range (e.g. 4600–5250 rpm). The power which may be applied from the rotation of the blades 12 to the hydraulic load 32 is less than the maximum power which may be applied to the hydraulic load during rotation of the blades in a first rotational velocity range. The first rotational velocity range (e.g. above 5250 rpm) is controlled by the operation of the governor 16 in varying the pitch of the blades 12 in association with the operation of a pressure regulator contained within the variable displacement hydraulic pump 19.

The RAM air turbine 30 has a power controller 40, driven by rotation of the blades, for controlling power applied from the blades to the load as a function of airplane velocity in the second rotational velocity range below the first rotational velocity range. The operation of the invention in the second rotational speed range under control of the power controller 40 is independent of operation of the invention in the first rotational speed range. Therefore, as explained in detail below with reference to FIG. 5, failure of the speed detector 46 of the power controller does not disable the generation of emergency power in the first rotational speed range. The power controller 40 is comprised of a gearbox 42 which supplies torque to the variable displacement hydraulic pump 19 by means of drive shaft 44, a speed detector 46, which is driven by a coupling through drive shaft 48 producing a control output 50 of pressurized hydraulic fluid applied to a displacement control 52 controlling the displacement of the variable displacement hydraulic pump 19 in the second rotational velocity range. Pressurized hydraulic fluid 54 applied to the displacement control 52 controls the displacement of the variable displacement hydraulic pump 19 in the first rotational velocity range. The pressurized hydraulic fluid output 50 from the speed detector 46 commands the displacement of the variable displacement hydraulic pump 19 to be reduced to zero for a third rotational velocity range of the blades 12 which extends from stop up to the minimum velocity of the second rotational velocity range which in the preferred embodiment of the present invention is 4600 rpm. The hydraulic power provided by the pressurized hydraulic fluid 20 from the variable displacement hydraulic pump 19 in the second rotational velocity range enables the pilot of an airplane to have power useful for controlling the flight control surfaces down to an airspeed of approximately 96 knots equivalent airspeed. The increased margin of safety provided to a pilot by providing reduced emergency power at velocities close to the stall velocity of the aircraft substantially reduces the possibility of no flight control in the speed ranges between 100–125 knots to provide an increased margin of safety to the pilot.

FIG. 2 illustrates a block diagram of the prior art variable displacement pump 19, speed detector 46 and displacement control 52 of the RAM air turbine 30 of FIG. 1. The displacement control 52 is comprised of an anti-stall piston 60 which is movable between a first position as illustrated in FIG. 2 and a second position located to the right with respect to FIG. 2, a stroking piston 62, which is movable between a first position, as illustrated in FIG. 2, and a second position located to the right with respect to FIG. 2 and a rate piston 64 which contacts a wobble plate (illustrated in FIG. 3) and applies force resisting the force applied by spring 66 to vary the displacement of the variable displacement hydraulic pump 19 which has a low pressure inlet 68 and a high pressure outlet 70. The variable displacement hydraulic pump 19 is only illustrated schematically with respect to the low pressure inlet 68 and the high pressure outlet 70. The stroking piston 62 is movable independently of the anti-stall piston 60 in the first rotational velocity range. Movement of the anti-stall piston 60 during the second rotational velocity range under the control of a second hydraulic control signal applied on a second hydraulic control circuit 72 to the right with respect to FIG. 2 reduces the displacement of the variable displacement hydraulic pump 19. The anti-stall piston 60 provides a variable stop for the control of pressurized hydraulic fluid which may be delivered under the control of the stroking piston 62 which controls the displacement of the variable displacement hydraulic pump 19 under the control of the first hydraulic control signal on hydraulic line 148 as described below. Movement of the anti-stall piston 60 forces the stroking piston 62 outward from its recessed position within bore 74 within the body 76. The bore 74 has a first section 78 and a second section 80 which are coaxial. The diameter of the first section 78 is larger than the diameter of the second section 80. The bottom 82 of the first section 78 stops movement of the anti-stall piston 60. The stroking piston 62 moves independently of the anti-stall piston 60 and extends to the right from the position of FIG. 2 in reducing the displacement of the variable displacement hydraulic pump 19 from the maximum displacement as illustrated during rotation of the blades 12 in the first and second rotational velocity ranges. In the first rotational velocity range the anti-stall piston 60 is fixed in the position as illustrated in FIG. 2. In the second rotational velocity range, the anti-stall piston 60 varies from its first position with a maximum stop permitting maximum displacement to a minimum stop which produces minimum displacement (zero). The second hydraulic control signal, which controls the movement of the anti-stall piston 60 between the first and second positions, is controlled by the anti-stall spool valve 90 which contains an axially movable spool 92 having lands 94–100. Lands 94 and 96 are connected by section 102 having a reduced diameter which permits hydraulic fluid flow between the lands. Similarly, lands 96 and 98 are connected by section 104 which permits hydraulic fluid flow between the lands. Finally, lands 98 and 100 are connected by section 106 which permits hydraulic fluid flow between the lands. The speed detector 46 is a gear pump which pressurizes hydraulic fluid from case pressure to a high pressure output which is connected to the bore 108 within the spool valve 90 by fluid coupling 110. A spring 112, which has an adjustable compression adjusted by turning fitting 114, biases the spool to the left. Rotation of the blades 12 causes rotation of the speed detector 46 through the torque coupling 48 of FIG. 1 to pressurize hydraulic fluid at the output of the gear pump with a pressure which is a function of the rotational velocity of the blades 12. It should be noted that the gearbox 42 drives the variable displacement hydraulic pump 19 with a slightly different velocity than the rotational velocity of the input 14 with the difference being approximately 100 rpm at 5250 rpm of the blades 12. The gear pump 46 produces a pressurized hydraulic fluid output which varies in pressure as a function of the rotational velocity of the blades which produces a force acting on the spool 92 to the right to cause movement of the spool to produce compression of the spring 112. The degree of movement controls the generation of the second hydraulic control signal applied to the anti-stall piston by the second hydraulic control circuit 72, the first hydraulic control signal applied to the stroking piston 62 through the first hydraulic circuit 148 and the commanding of the displacement of the variable displacement hydraulic pump 19 to the maximum displacement stop within the second rotational velocity range when the gear pump 46 fails as discussed below. The orifice 114' develops a pressure differential across the respective ends of the spool 92 which is equal to the difference between the high pressure output from the gear pump 46 and the inlet pressure at the inlet 68 of the variable displacement hydraulic pump 19 and bleeds the pressurized hydraulic fluid back to a lower pressure. The pressure differential across orifice 114' produces a high speed response in the spool 92 in moving in response to increased rotational velocity of the blades 12 which provides high speed pressure changes in response to changing hydraulic load conditions. It has been discovered that the pressure differential across orifice 114' is temperature dependent which affects operation as discussed below. The function of the lands 94–100 is described in detail below. The second hydraulic circuit 72 contains a bifurcation 120 with a first part 122 connected to a first axial position 124 of the bore 108 of the spool valve 90 in which the spool 92 moves and a second part 126 connected to a second axial position 128 separated from the first axial position by an axial displacement. The second section 126 functions to bleed high pressure hydraulic fluid trapped in the second hydraulic circuit 72 which is produced by the high pressure output 70 being coupled to the second hydraulic circuit within the second rotational velocity range when the gear pump 46 fails. In this situation, the trapped high pressure hydraulic fluid within the second hydraulic circuit 72 bleeds from the first hydraulic circuit to the case pressure across the axial displacement by bypassing the land 98 to a hydraulic circuit 130 which is connected to the inlet 68 of the variable displacement hydraulic pump 19. As a result, the system will operate in accordance with the prior art which permits emergency power to be generated in the first rotational speed range.

The movement of the spool 92 in response to the pressurized hydraulic fluid output from the gear pump 46 to the right in generating the second hydraulic control signal applied to the anti-stall piston 60 in the third rotational velocity range is described as follows. For speeds from zero to 4600 rpm, the spool 92 moves a distance axially within the bore 108 of the spool valve 90 which is a function of the pressure of the pressurized hydraulic fluid output from the gear pump 46. Movement of the spool 92 to the right, in response to the pressurized hydraulic fluid output from the gear pump 46, within the bore 108 of the spool valve 90 connects high pressure hydraulic fluid circuit 140, which is connected to the high pressure outlet of the variable displacement hydraulic pump 19, to the second hydraulic fluid circuit 72 when the edge 142 of the land 98 moves to the right sufficiently to be at least axially aligned with the axial position 144 at which the high pressure hydraulic circuit 140 is connected to the bore 108 of the spool valve 90. At this position and positions to the right, the spool 92 permits fluid flow in the reduced diameter section 104 between the high pressure output 70 through hydraulic circuit 140 to the first hydraulic circuit 72 to cause the anti-stall piston 60 to move from the first position to the second position commanding zero displacement for the variable displacement hydraulic motor 19. The spool 92 moves to the right as a function of the increase of the rotational velocity of the blades 12.

When the rotational velocity of the blades 12 reaches the lowest speed in the second rotational velocity range, the right hand part of the land 96 is located just to the left of the axial position 124 in a first position. As the rotational velocity of the blades 12 within the second rotational velocity range increases, the land 96 moves from the first position to the right toward a second position to begin to occlude the inlet port 146 of the second hydraulic circuit 72 to proportionally reduce the pressure of the hydraulic coupling between the high pressure outlet 70 of the variable displacement hydraulic pump 19 and the anti-stall piston 60. The anti-stall piston 60 is positioned in a second stop position causing the stroking piston 62 to be positioned at the second position to command a zero flow rate from the variable displacement hydraulic motor 19 as the land 96 begins to occlude the inlet port 146. The pistons 60 and 62 proportionally move from a second position commanding the minimum displacement (zero) to their first position which commands the maximum displacement stop of the variable displacement hydraulic pump in proportion to the degree of occlusion of the inlet port 146 by the land 96. At the lower limit of the first rotational velocity range, the pistons 60 and 62 are positioned in their first position to command a maximum displacement stop of the variable displacement hydraulic pump 19 and the land 96 is located in its second position.

For rotational velocities within the first rotational velocity range of the blades 12, the anti-stall piston 60 is withdrawn to its first position with a maximum displacement stop. A first hydraulic control signal applied on the first hydraulic circuit 148 to the stroking piston 62 controls the displacement of the variable displacement hydraulic pump 19 in proportion to the difference in pressure between the high pressure output 70 of the variable displacement hydraulic pump and a lower pressure present in the first hydraulic circuit produced by the pressure regulator 150. The pressure regulator 150 contains a spring bias 152 having an adjustable compression which is adjusted by turning of threaded member 154. The high pressure hydraulic fluid output from the high pressure output 70 of the variable displacement hydraulic pump 19 is bled to a lower pressure which is the first hydraulic control signal within the first hydraulic circuit 148 under the action of the pressure regulator 150. The movable member 156 moves axially within the bore 158 of the pressure regulator 150 to bleed a portion of the high pressure hydraulic fluid from the high pressure output 70 to a lower pressure to produce a first hydraulic control signal which is the pressure for controlling the displacement of the stroking piston to vary the displacement of the variable displacement hydraulic pump 19. The displacement of the variable displacement hydraulic pump 19 in the first operational range is controlled by the pressure drop between the high pressure output 70 of the variable displacement hydraulic pump and the pressure of the second hydraulic control signal which varies under the action of the bias applied by spring 152 in regulating the output pressure. The pressure regulator 150 controls the pressure in the output 70 of the variable displacement hydraulic pump 19 within a narrow range such as, but not limited to, 3,000–3,200 psi.

FIG. 3 illustrates the prior art displacement control mechanism for the variable displacement hydraulic pump 19 of FIG. 1. The displacement of the variable displacement hydraulic pump 19 is reduced to zero during rotation of the blades 12 in the first rotational velocity range. The stroking piston 62 rides on a slipper 200 attached to one end of a wobbler 202. The rate piston 64 rides on a slipper 200 attached to an opposed end of the wobbler which applies force through the action of compression of spring 66 against the extension of the stroking piston 62 caused by the first hydraulic control signal. The wobbler 202 pivots about axis 204 in a conventional manner. The displacement of the variable displacement hydraulic pump is proportional to the angle of inclination of the wobbler 202 with respect to the axis of rotation 204. The maximum displacement of the variable displacement hydraulic pump 19 occurs when the anti-stall piston 60 is fully withdrawn into the body 52 touching the bottom end of the stroking piston 62. Pistons 206 sweep out bores within the barrel cylinder 208 to pressurize hydraulic fluid from a low pressure inlet 68 to a high pressure outlet 70 which is carried in a port plate (not illustrated) in a conventional manner. During operation in the second rotational velocity range, the anti-stall piston 60 moves from the position as illustrated to an extended position which forces the stroking piston 62 outward to vary the displacement of the variable displacement hydraulic pump 19 from a maximum displacement stop to a minimum displacement stop as illustrated in FIG. 3 with it being understood that the anti-stall piston is in contact with the stroking piston in this mode of operation. The variation in the maximum displacement stop in the second rotational velocity range is a function of the rotational velocity of the blades 12.

FIG. 4 illustrates the prior art operation of the variable displacement hydraulic pump 19 of FIG. 3 at zero RPM for blade velocities within the third rotational velocity range (e.g. from zero to 4600 rpm) at which the variable displacement hydraulic pump 19 is destroked to not produce emergency power so as to permit the blades to attain a velocity within the second rotational speed range. The variable displacement hydraulic pump 19 operates in the off loaded third rotational speed range without the volumetric fuse of the prior art. The power controller 40 controls the generation of emergency power in the second rotational speed range. Hydraulic pressure at various points within FIG. 4 is encoded with the key in the bottom right-hand corner. As the rotational velocity of the blades 12 increases the output pressure from the gear pump 46 on output 110 increases proportionately. The increased pressure forces the spool 92 to the right. When the edge 142 of land 98 moves past axial position 144, high pressure hydraulic fluid is coupled from the output 70 through reduced diameter section 104 between lands 96 and 98 to the second hydraulic line 72 to cause the anti-stall piston 60 and the stroking piston 62 to move all the way to the right as indicated by the single direction arrows pointing to the right for both the anti-stall piston 60 and the stroking piston 62 to cause the displacement of the variable displacement hydraulic pump 19 to be set to zero. With respect to FIG. 3 the anti-stall piston 62 would move downward into contact with the stroking piston 62 to cause the wobbler plate 202 to assume the position as illustrated. As the rotational velocity of the blades 12 increases, the spool 92 moves proportionately to the right. At 4600 rpm, the land 96 begins to occlude the inlet to the second hydraulic control line 72 which causes the anti-stall piston 60 and the stroking piston 62 to move from a fully extended position (not illustrated) wherein the displacement of the variable displacement hydraulic pump 19 is at a minimum (zero) toward the position, as illustrated in FIG. 5, which represents the position of the first and second hydraulic control pistons below 4600 rpm.

FIG. 5 illustrates the prior art operation of the variable displacement hydraulic pump 19 at 4600 rpm for blade velocities within the second rotational velocity range (e.g. between 4600–5250 rpm). This is the range of rotational velocities in which useful power is outputted from the variable displacement hydraulic pumps 19 under the control of the power controller 40 at a rate which is less than the power which may be outputted by the variable displacement hydraulic pump in the first rotational velocity range. Movement of the anti-stall piston 60 and the stroking piston 62 is bidirectional in the second rotational velocity range. As illustrated with the velocity of the blades being at the minimum velocity in the second rotational velocity range the movement of the anti-stall piston 60 and the stroking piston 62 is to the left as indicated by the single direction arrows pointing to the left for both pistons. As the rotational velocity of the blades 12 increases from 4600 rpm, the land 96 begins to occlude the inlet port 146 to cause a drop in pressure in the second hydraulic control line 72 which causes the displacement stop of the variable displacement hydraulic pump 19 to be increased from zero at 4600 rpm until it reaches its maximum displacement stop at 5250 rpm. The pressure regulator 150 functions in conjunction with the variation in the displacement stop of the variable displacement hydraulic pump to cause constant power to be generated. At 5250 rpm, the control of the displacement of the variable displacement hydraulic pump is no longer under the control of the second hydraulic control line 72 as a consequence of the inlet pressure being coupled to the second hydraulic control line through the reduced diameter section 102 of the spool 92.

FIG. 6 illustrates the prior art operation of the variable displacement hydraulic pump 19 in the first rotational velocity range above 5250 rpm with the stroking piston 62 being positioned at maximum displacement. In the first rotational velocity range, the governor 16 in combination with the pressure regulator 150 controls the operation of the system such that the pitch of the blades 12 and the pressure of the hydraulic fluid outputted on the high pressure output 70 is within a specified pressure range, such as between 3,000–3,200 psi. In this operational range of velocities of the blades 12 the stroking piston 62 moves independently outward from the anti-stall piston as illustrated in FIG. 3 wherein the anti-stall piston is fully withdrawn into the bore 78 as illustrated in FIG. 6. The anti-stall piston 60 does not move from the first position as illustrated during operation within the third speed range. The position of the anti-stall piston 62 varies from the first position as illustrated wherein a maximum displacement of the variable displacement hydraulic pump 19 is produced to a second position in which the stroking piston 62 is fully extended as illustrated in FIG. 3 wherein zero displacement of the variable displacement hydraulic pump is produced. The demands placed on the variable displacement hydraulic pump 19 by the hydraulic load 32 cause the stroking piston 62 to vary in between the first and second positions. The variation between the first and second positions is a function of the pressure drop from the output of the high pressure outlet 70 to case pressure which is the hydraulic control signal for the stroking piston 62. The displacement of the variable displacement hydraulic pump 19 in the first rotational velocity range is an inverse function of the pressure drop between the high pressure output 70 and case pressure which is produced by the operation of the spool 158 within the pressure regulator 150. Movement of the spool 158 in response to the change in output pressure on the outlet 70 causes the pressure drop between the high pressure output and case pressure to vary which modulates the position of the stroking piston 62 in a manner which is an inverse function of the pressure. The anti-stall piston 60 does not move from the position as illustrated during operation within the first rotational velocity range as a consequence of the governor 16 and the pressure regulator 150 controlling the coupling of power from the variable displacement hydraulic pump 19 to the hydraulic load 32.

The larger diameter of the anti-stall piston 60 in comparison to the diameter of stroking piston 62 provides for the anti-stall piston to have a quick response to small pressure differences between the first and second hydraulic control signals. As a result, the displacement of the variable displacement hydraulic pump is rapidly varied to prevent stalling and production of constant power.

The operation of the RAM air turbine of the prior art of FIGS. 1–6 has in practice been sensitive to temperature. The minimal speed of anti-stall control in a RAM air turbine, in accordance with the prior art of FIGS. 1–6, is set at the ambient temperature of a laboratory. However, as a result of the temperature dependency of the pressure differential generated by orifice 114' at the cold ambient temperature of sustained flight, the minimum anti-stall speed of the second rotational velocity range increases. The proper function of the anti-stall piston 60 and the anti-stall valve 90 insures that stalling does not occur within the second rotational velocity range regardless of ambient flight temperature but the net result of lowering the operational range of the second rotational velocity caused by low sustained flight temperatures is that less power is generated during emergency operation.

Additionally, at elevated hydraulic fluid temperatures of sustained operation, the anti-stall speed range of the second rotational velocity range increases. The proper operation of anti-stall control requires that the second rotational velocity range does not overlap the first rotational velocity range. If the increase in anti-stall speed due to an elevated hydraulic fluid temperature is sufficient to cause these rotational velocity ranges to overlap, the combined effect of the simultaneous operation of anti-stall speed control and the control of the RAM air turbine governor 16 may result in a reduction in the power output of the RAM air turbine.

DISCLOSURE OF INVENTION

The present invention is a fluid driven turbine for use in generating power by driving a load with a fluid stream intercepting blades of the turbine having a preferred application in a RAM air turbine for use in generating power (either emergency or non-emergency) in an aircraft. The invention provides a solution to the aforementioned problem of the prior art in the second rotational velocity range in which the output of useful power in the second rotational velocity range is increased by eliminating the problem of the output power during the second rotational velocity being temperature dependent and being reduced by low sustained flight temperatures or elevated hydraulic fluid temperatures.

The invention is based upon the discovery that the pressure drop across the orifice 114' of the prior art discussed above causes the pressure differential developed by orifice 114' to be sufficiently temperature dependent to shift the nominal speed of the anti-stall speed control (approximately 5%). The invention uses a pressure dropping orifice in place of the orifice of the prior art which produces a coefficient of discharge which is preferably constant which is independent of viscosity. The orifice comprises a turbulence producing structure located in a flow path of the hydraulic fluid upstream of the orifice which creates turbulent flow generally perpendicular across the orifice. The turbulence producing structure comprises at least one flow obstructing surface extending into the flow path, which faces the fluid flow, and may be without limitation at least one curved surface extending into the flow path which faces the fluid flow which may be a partially spherical surface, a full spherical surface, or at least one rod which extends with the flow path. The aforementioned orifice and turbulence producing structures are described in the Assignee's U.S. Pat. No. 3,277,768 which is incorporated herein by reference in its entirety.

A fluid driven turbine for use in generating power by driving a load with a fluid stream intercepting blades of the turbine and the turbine applying power to the load during rotation of the blades in accordance with the invention includes a variable displacement hydraulic pump which is driven by rotation of the blades, including a displacement control having an element which is responsive to a control signal for varying the displacement of the variable displacement hydraulic pump for producing a pressurized hydraulic fluid output to drive the load; and a hydraulic control valve which generates the control signal in response to a hydraulic signal which is a function of speed changes of the blades and a pressure dropping orifice, responsive to the hydraulic signal which is a function of speed changes of the blades which bleeds the hydraulic signal to a lower pressure, the orifice producing a coefficient of discharge of liquid independent of viscosity thereof; and wherein the control signal causes the element to vary displacement of the variable displacement pump which is a function of speed changes of the blades. The orifice further comprises a turbulence producing structure located in a flow path of the hydraulic fluid upstream of the orifice which creates turbulent flow generally perpendicular across the orifice. The turbulence producing structure comprises at least one flow obstructing surface extending into the flow path which faces the fluid flow. The turbulence producing structure comprises at least one curved surface extending into the flow path which faces the fluid flow which preferably is at least a partially spherical surface extending into the flow path or at least one rod which extends into the flow path.

A RAM air driven turbine for use in generating power by driving a load with a RAM air stream intercepting blades of the turbine and the turbine applying power to the load during rotation of the blades in accordance with the invention includes a variable displacement hydraulic pump which is driven by rotation of the blades, including a displacement control having an element which is responsive to a hydraulic control signal for varying the displacement of the variable displacement hydraulic pump for rotational velocities of the blades for producing a pressurized hydraulic fluid output; and a hydraulic control valve which generates the control signal in response to a hydraulic signal which is a function of speed changes of the blades and a pressure dropping orifice, responsive to the hydraulic signal which is a function of speed changes of the blades which bleeds the hydraulic signal to a lower pressure, the orifice producing a coefficient of discharge of liquid independent of viscosity thereof; and wherein the control signal causes the element to vary displacement of the variable displacement pump which is a function of speed changes of the blades. The hydraulic control valve comprises a valve body having a bore in which is mounted a spool which moves in response to the hydraulic signal coupled to the spool between first and second positions with the movement controlling outputting of the hydraulic control signal in response to an input of hydraulic fluid coupled to the pressurized hydraulic fluid output. The hydraulic control valve further comprises a plurality of lands axially spaced apart along a longitudinal axis of the spool, an input port in the bore which receives hydraulic fluid coupled to the pressurized hydraulic fluid output and an output port which outputs the hydraulic control signal with an input to the valve body being the hydraulic signal with the hydraulic signal causing the lands to move to control outputting of the hydraulic control signal. The hydraulic control valve further comprises a spring which biases the spool in a first position within the bore and the hydraulic signal causes the spool to move from the first position toward a second position with movement toward the second position cutting off the outputting of the hydraulic control signal from the output port. The turbine is a RAM air turbine in an airplane. The displacement control further comprises a stroking piston which is responsive to another hydraulic control signal for varying displacement of the variable displacement pump in a first rotational velocity range, and wherein the element is an anti-stall piston which varies displacement of the variable displacement hydraulic pump in a second rotational velocity range below the first rotational velocity range with the pressurized hydraulic fluid output driving a hydraulic load in the first and second rotational velocity ranges. The orifice further comprises a turbulence producing structure located in a flow path of the hydraulic fluid upstream of the orifice which creates turbulent flow generally perpendicular across the orifice. The turbulence producing structure comprises at least one flow obstructing surface extending into the flow paths which faces the fluid flow. The turbulence producing structure comprises at least one curved surface extending into the flow path which faces the fluid flow and preferably comprises at least a partially spherical surface extending into the flow path or at least one rod which extends into the flow path.

A RAM air turbine for use in generating power in an airplane by driving a load with a RAM airstream intercepting blades of the turbine with the turbine and the turbine applying power to the load during rotation of the blades in accordance with the invention comprises a variable displacement hydraulic pump which is driven by rotation of the blades, including a displacement control having an element which is responsive to a hydraulic control signal for varying the displacement of the variable displacement hydraulic pump for rotational velocities of the blades, for producing a pressurized hydraulic fluid output to drive a hydraulic load; and a hydraulic control valve which generates the control signal in response to a hydraulic signal which is a function of speed changes of the blades and a pressure dropping orifice, responsive to the hydraulic signal which is a function of speed changes of the blades which bleeds the hydraulic signal to a lower pressure, the orifice producing a coefficient of discharge of liquid independent of viscosity thereof; and wherein the control signal causes the element to vary displacement of the variable displacement pump which is a function of speed changes of the blades. The control signal is a hydraulic control signal which is generated from a controlled flow of hydraulic fluid coupled to the pressurized hydraulic fluid output to the element. The hydraulic valve further comprises a spool mounted within a bore which moves along a longitudinal axis in response to the hydraulic signal with movement of the movable element controlling a rate of flow of hydraulic fluid coupled to the pressurized hydraulic fluid output. The hydraulic valve further comprises a plurality of lands axially spaced apart along a longitudinal axis of the spool, an input port in the bore which receives hydraulic fluid coupled to the pressurized hydraulic fluid output and an output port which outputs the hydraulic control signal with an input to the valve body being the hydraulic signal with the hydraulic signal causing the lands to move to control outputting of the hydraulic control signal. The hydraulic control valve further comprises a spring which biases the spool in a first position within the bore and the hydraulic signal causes the spool to move from the first position toward a second position with movement toward the second position cutting off the outputting of the hydraulic control signal from the output port. The displacement control further comprises a stroking piston which is responsive to another control signal for varying displacement of the variable displacement pump in a first rotational velocity range, and wherein the element is an anti-stall piston which varies displacement of the variable displacement hydraulic pump in a second rotational velocity range below the first rotational velocity range with the pressurized hydraulic fluid output driving a hydraulic load in the first and second rotational velocity ranges. The orifice further comprises a turbulence producing structure located in a flow path of the hydraulic fluid upstream of the orifice which creates turbulent flow generally perpendicular across the orifice. The turbulence producing structure comprises at least one flow obstructing surface extending into the flow path which faces the fluid flow. The turbulence producing structure comprises at least one curved surface extending into the flow path which faces the fluid flow and preferably is at least a partially spherical surface extending into the flow path at least one rod which extends into the flow path.

BEST MODE FOR CARRYING OUT THE INVENTION

The present invention is an improvement of a variable displacement pump 19 in accordance with the prior art of FIGS. 1–6 which produces emergency power which does not vary in output level in response to temperature variation occurring during sustained flight. An orifice 114", illustrated in detail in FIGS. 8–11, performs the function of orifice 114' of the prior art of FIGS. 1–6 without any temperature dependency of the pressure drop as a function of temperature. The orifice 114" produces at least a substantially constant or constant coefficient of discharge of liquid independent of viscosity thereof which causes the pressure drop across the orifice to be temperature independent. The pressure drop across the orifice 114" during the variation in temperature of sustained flight of an aircraft across the orifice 114" is substantially temperature independent even though the viscosity of the hydraulic fluid varies appreciably. The overall operation of the variable displacement pump of the invention is in accordance with the prior art of FIGS. 1–6 and will not be described hereinafter.

Figure 1:
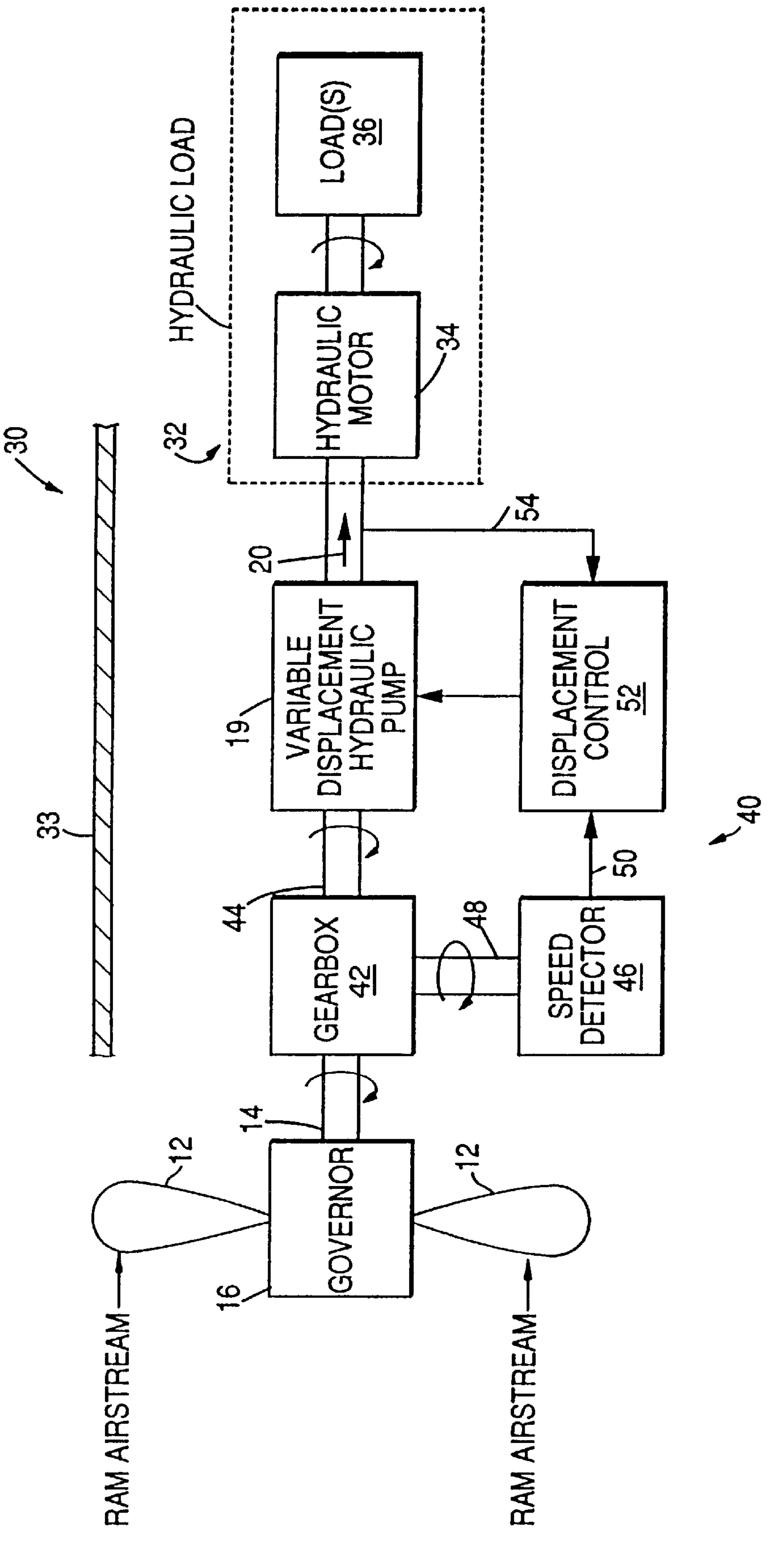
FIG. 1 (PRIOR ART)
FIG. 1 describes a block diagram of a system in accordance with the Assignee's U.S. Pat. Nos. 5,122,036 and 5,145,324.
Figure 2:
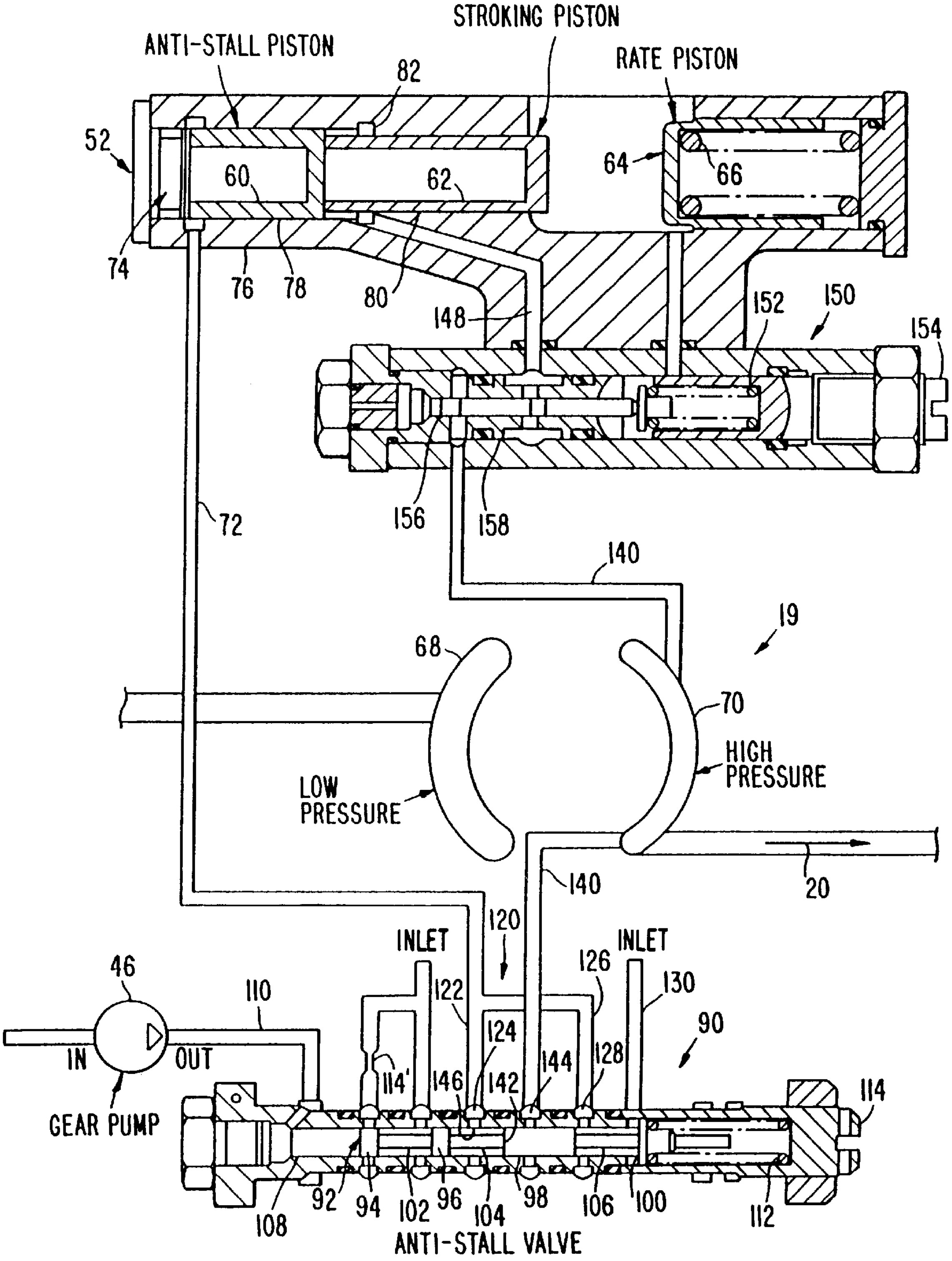
FIG. 2 (PRIOR ART)
FIG. 2 is a hydraulic control diagram of the variable displacement hydraulic pump of FIG. 1 in accordance with the Assignee's U.S. Pat. Nos. 5,122,036 and 5,145,324.
Figure 3:
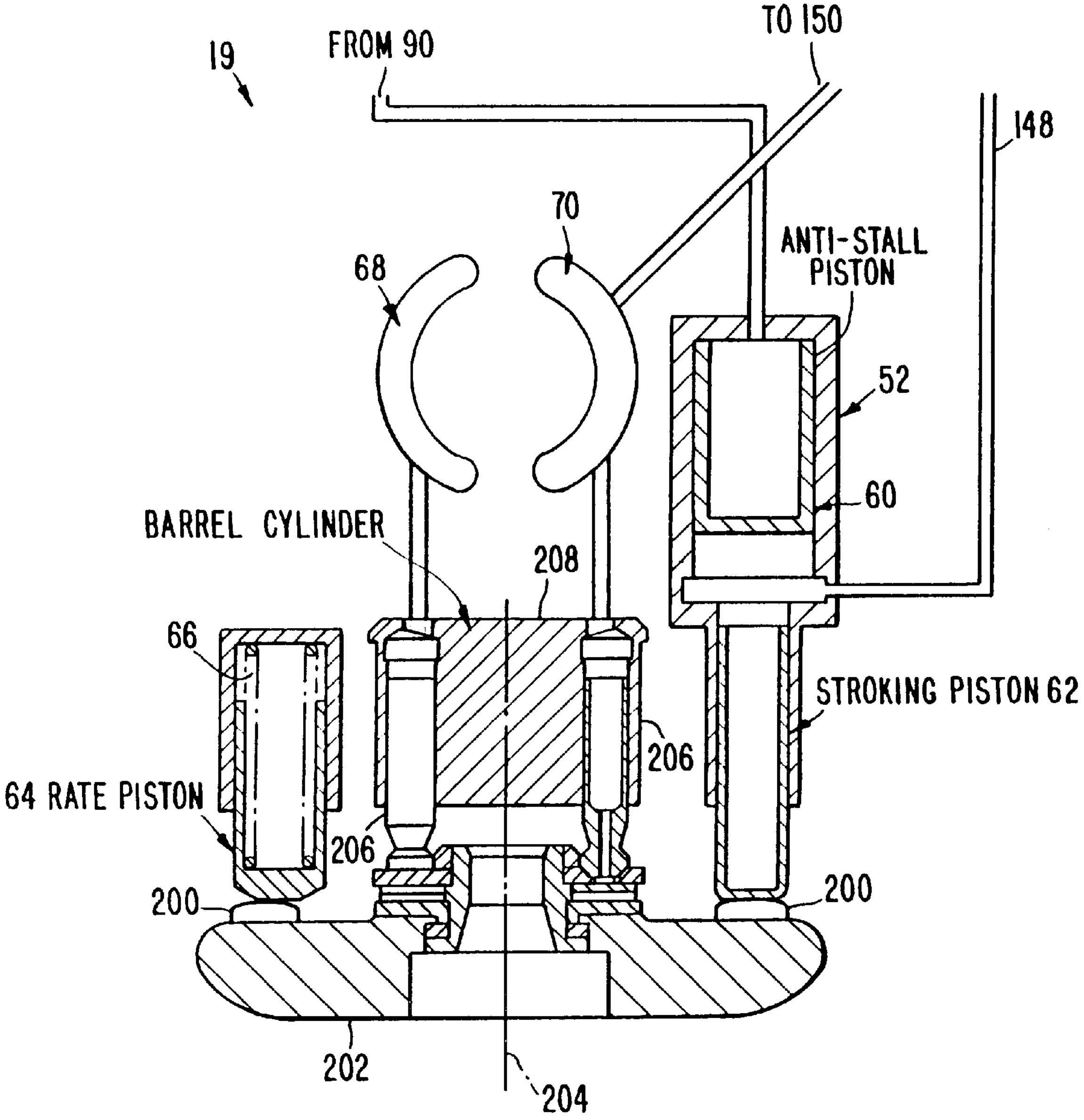
FIG. 3 (PRIOR ART)
FIG. 3 is a diagram of the variable displacement pump of the Assignee's U.S. Pat. Nos. 5,122,036 and 5,145,324.
Figure 4:
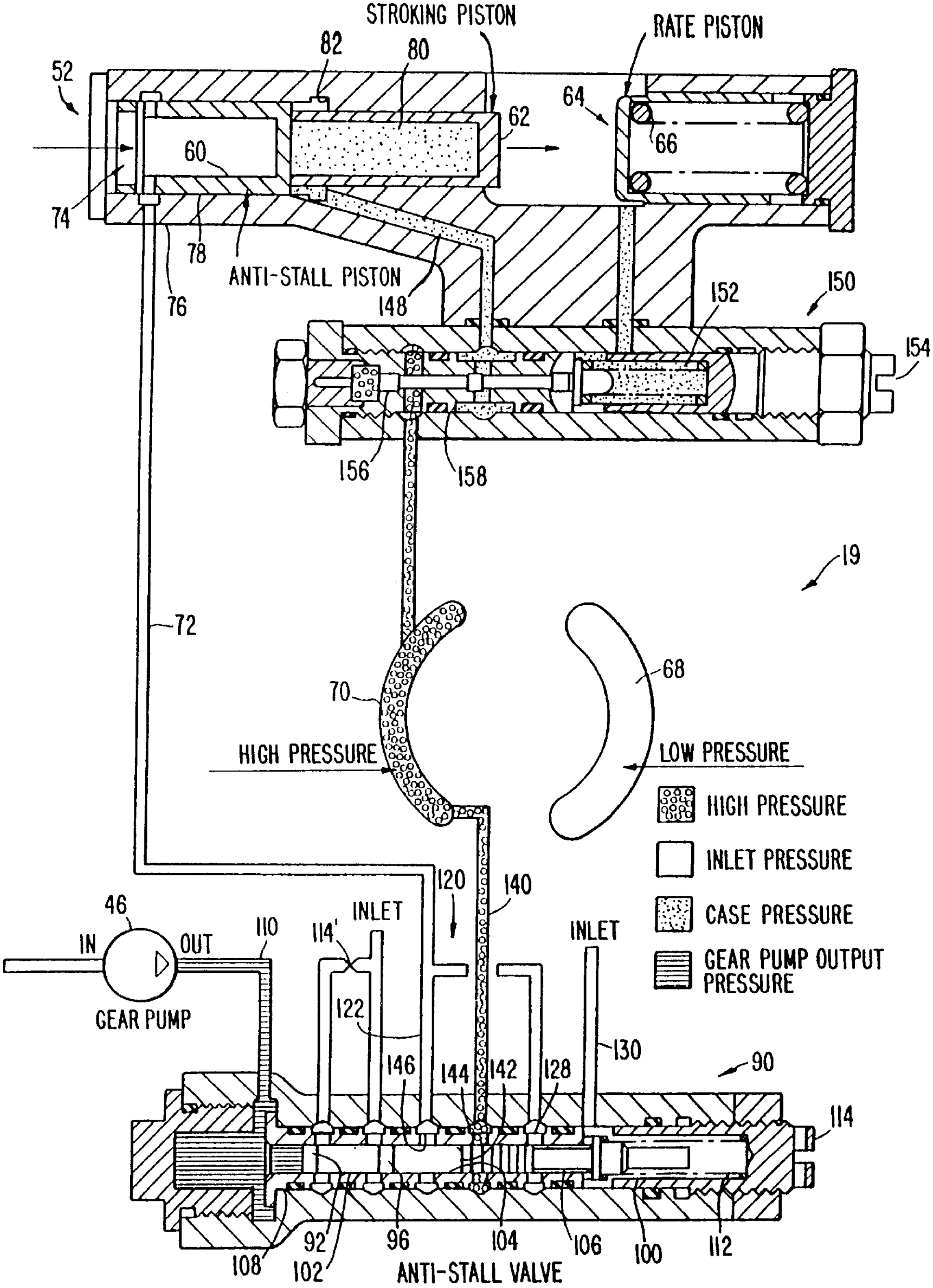
FIG. 4 (PRIOR ART)
FIG. 4 illustrates the operation of the variable displacement pump of the Assignee's U.S. Pat. Nos. 5,122,036 and 5,145,324 for a third range of rotational velocities of the air turbine from zero up to a threshold velocity.
Figure 5:
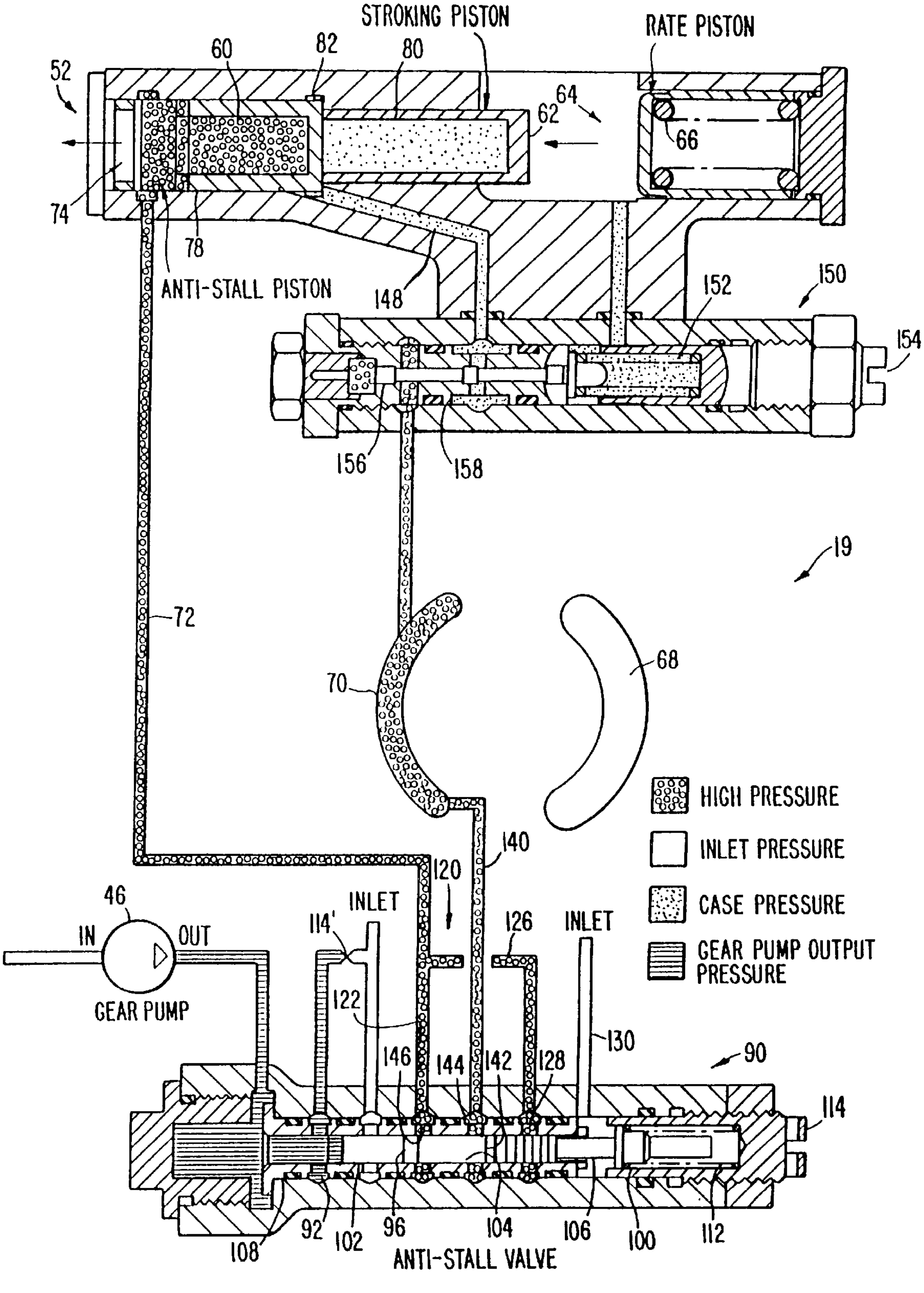
FIG. 5 (PRIOR ART)
FIG. 5 illustrates the operation of the variable displacement pump of the Assignee's U.S. Pat. Nos. 5,122,036 and 5,145,324 for a second velocity range above the threshold velocity.
Figure 6:
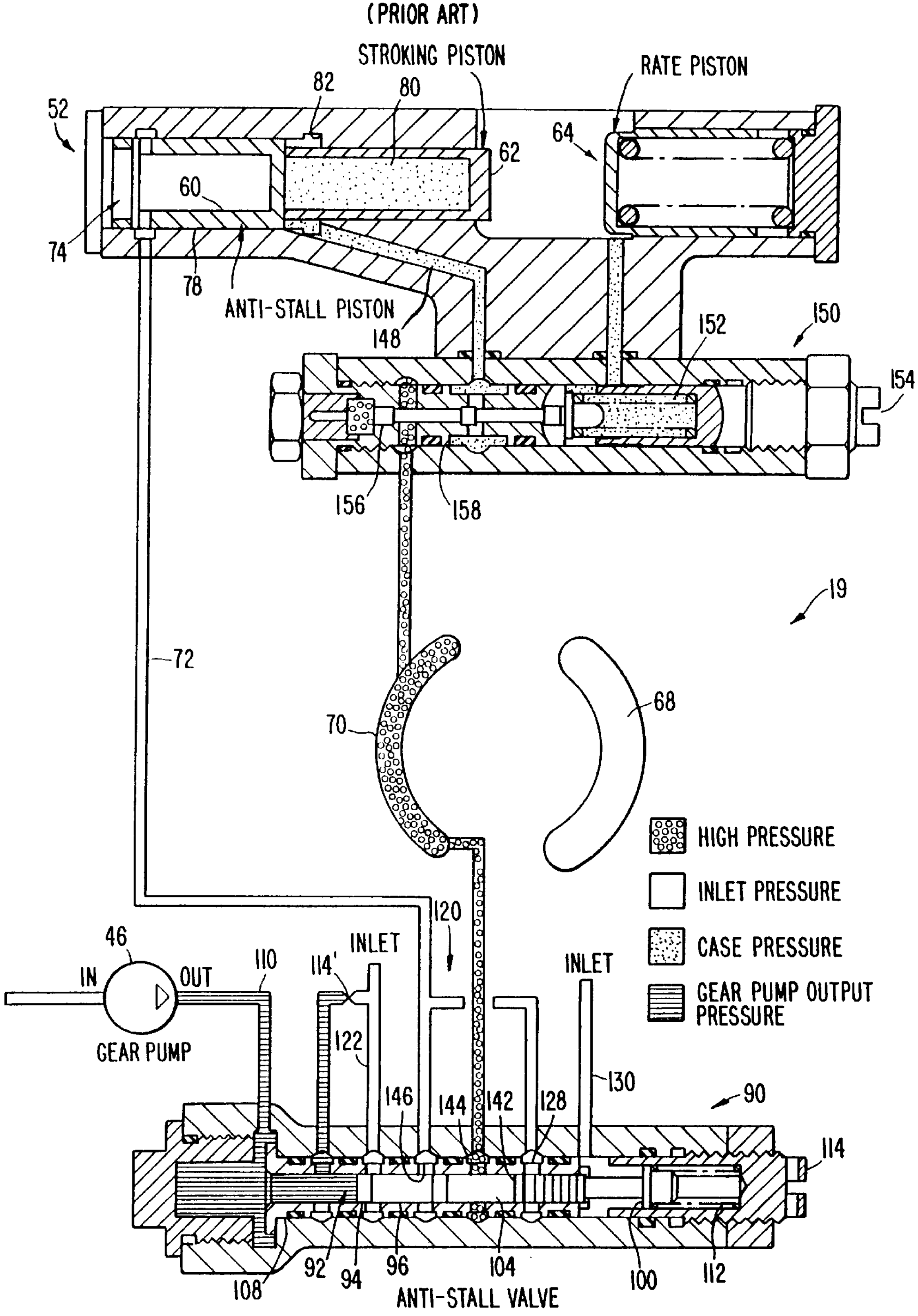
FIG. 6 (PRIOR ART)
FIG. 6 illustrates the operation of the variable displacement pump of the Assignee's U.S. Pat. Nos. 5,122,036 and 5,145,324 for a first velocity range above the second velocity range.
Figure 7:
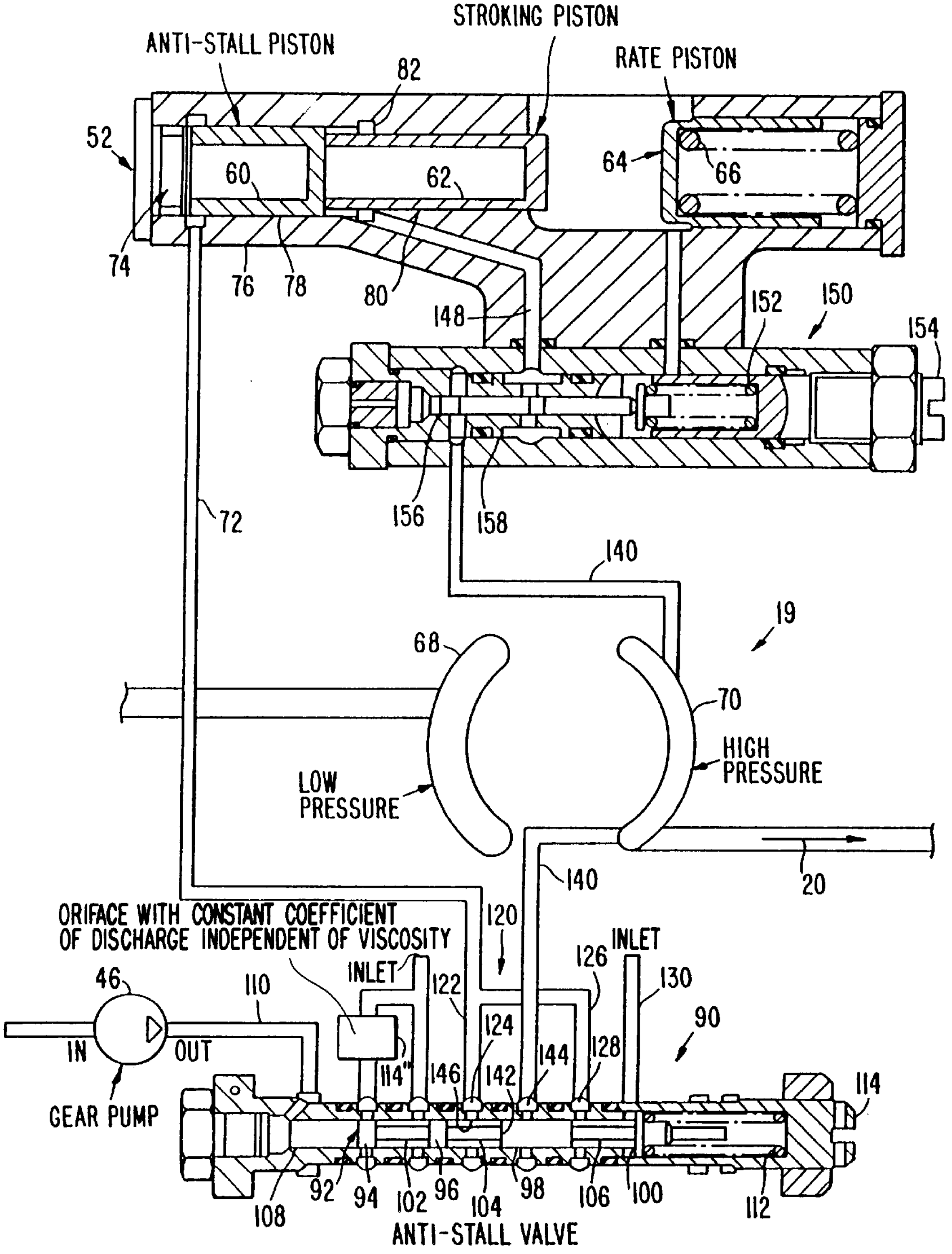
FIG. 7 illustrates a variable displacement hydraulic PUMP in accordance with the invention.

FIG. 7 illustrates an embodiment of a fluid driven turbine for use in generating power by driving a load with a fluid stream intercepting blades of the turbine and the turbine applying power to the load during rotation of the blades having a preferred application of generating emergency power in an airframe. The embodiment of the present invention is identical to the prior art of FIGS. 1–6 except that the orifice 114' of the prior art, which has a temperature dependent pressure drop as described in conjunction with the prior art, has been replaced with an orifice 114" with a substantially constant or constant coefficient of discharge independent of viscosity. The function of the orifice 114" is identical to the prior art of orifice 114' except that the pressure drop across the orifice 114" is substantially temperature independent across the normal operating temperature of the RAM air turbine environment which can vary from temperatures of −60° ambient to above 200° F. hydraulic fluid temperature.

Preferred designs of the orifice 114" are described below in conjunction with FIGS. 8–11 and are generally in accordance with the Assignee's U.S. Pat. No. 3,277,708 except that ports are not utilized respectively located upstream and downstream of the orifice for communicating with sensing devices to sense the pressure differential across the orifice as described in U.S. Pat. No. 3,277,708.

The invention is based upon the discovery that the port 114' of the prior art of FIGS. 1–6 developed a pressure drop which was substantially dependent upon temperature variation. This change in pressure drop as a function of temperature reduces the generated power, which could be emergency power to maintain emergency flight control of an aircraft, outputted during the second rotational velocity range as described above in conjunction with the prior art of FIGS. 1–6.

Figure 8:
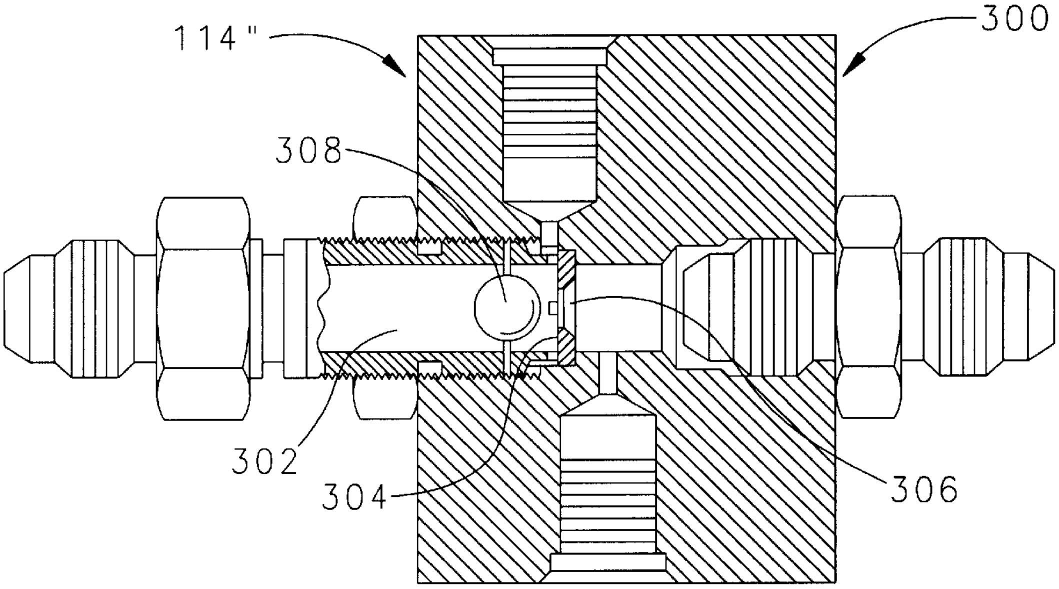
FIG. 8 illustrates a first embodiment of an orifice and turbulence producing structure in accordance with the present invention.
Figure 9:
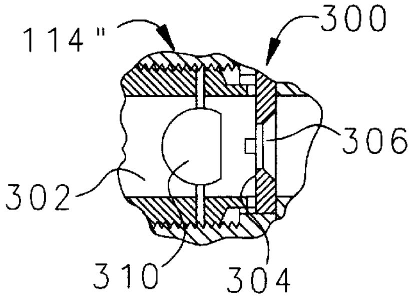
FIG. 9 illustrates a second embodiment of an orifice and turbulence producing structure in accordance with the present invention.
Figure 10:
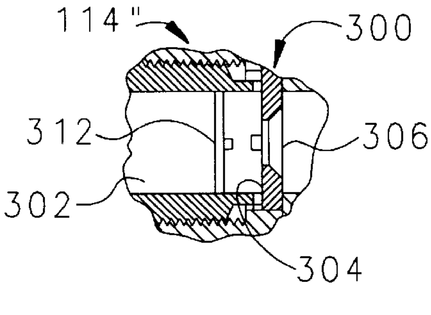
FIGS. 10 and 11 illustrate a third embodiment of an orifice and turbulence producing structure in accordance with the present invention.
Figure 11:
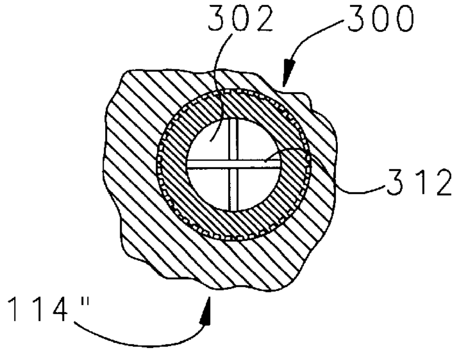

FIGS. 8–11 illustrate three embodiments of the orifice 114" having a substantially constant or a constant coefficient of discharge independent of viscosity. The orifice 114" includes a turbulence producing structure 300 located in a flow path 302 of hydraulic fluid outputted from the gear pump 46 illustrated in FIGS. 2 and 4–6 of the prior art. The turbulence producing structure 300 is located upstream of a thin, flat disk 304 which contains an orifice 306 through which the fluid flows. The turbulence producing structure 300 comprises at least one flow obstructing surface extending into the flow path which faces the fluid flow. The turbulence producing structure 300 may have several different forms including, but not limited to at least one curved surface which, without limitation, may be a full sphere 308 as illustrated in FIG. 8, a partial sphere 310 as illustrated in FIG. 10 or at least one and preferably at least two rods 312 extending into the flow path 302.

The turbulence producing structure 300 creates turbulent flow generally perpendicular across the orifice 306 in the plate 304. Location of the turbulence producing structure 300 upstream of the orifice 306 may be in accordance with the spacings discussed in the Assignee's U.S. Pat. No. 3,277,708. The different turbulent producing structures 300 all create turbulence in front of the orifice 306 which produces a constant or substantially constant coefficient of discharge of fluid flow through the orifice in a liquid conduit including orifices such as a disk-type orifice.

While a preferred embodiment of the present invention is in a RAM air turbine, which generates emergency power in an airframe when the propulsion engines are inoperative, the invention has other applications, such as, but not limited to, all types of fluid driven turbines including air driven turbines, windmills, water driven turbines and gas driven turbines that drive variable displacement hydraulic pumps.

While the invention has been described in terms of its preferred embodiments, it should be understood that numerous modifications may be made thereto without departing from the spirit and scope of the invention as defined in the appended claims. It is intended that all such modifications fall within the scope of the appended claims.

What is claimed is:

1. A fluid driven turbine for use in generating power by driving a load with a fluid stream intercepting blades of the turbine and the turbine applying power to the load during rotation of the blades comprising:

a variable displacement hydraulic pump which is driven by rotation of the blades, including a displacement control having an element which is responsive to a control signal for varying the displacement of the variable displacement hydraulic pump for producing a pressurized hydraulic fluid output to drive the load; and a hydraulic control valve which generates the control signal in response to a hydraulic signal which is a function of speed changes of the blades and a pressure dropping orifice, responsive to the hydraulic signal which is a function of speed changes of the blades which bleeds the hydraulic signal to a lower pressure, the orifice producing a coefficient of discharge of liquid independent of viscosity thereof; and wherein the control signal causes the element to vary displacement of the variable displacement pump which is a function of speed changes of the blades.

2. A turbine in accordance with claim 1 wherein the orifice further comprises:

a turbulence producing structure located in a flow path of the hydraulic fluid upstream of the orifice which creates turbulent flow generally perpendicular across the orifice.

3. A turbine in accordance with claim 2 wherein:

the turbulence producing structure comprises at least one flow obstructing surface extending into the flow path which faces the fluid flow.

4. A turbine in accordance with claim 3 wherein:

the turbulence producing structure comprises at least one curved surface extending into the flow path which faces the fluid flow.

5. A turbine in accordance with claim 4 wherein:

the turbulence producing structure comprises at least a partially spherical surface extending into the flow path.

6. A turbine in accordance with claim 4 wherein:

the turbulence producing structure comprises at least one rod which extends into the flow path.

7. A fluid driven turbine for use in generating power by driving a load with a fluid stream intercepting blades of the turbine and the turbine applying power to the load during rotation of the blades comprising:

a variable displacement hydraulic pump which is driven by rotation of the blades, including a displacement control having an element which is responsive to a hydraulic control signal for varying the displacement of the variable displacement hydraulic pump for rotational velocities of the blades for producing a pressurized hydraulic fluid output; and a hydraulic control valve which generates the control signal in response to a hydraulic signal which is a function of speed changes of the blades and a pressure dropping orifice, responsive to the hydraulic signal which is a function of speed changes of the blades which bleeds the hydraulic signal to a lower pressure, the orifice producing a coefficient of discharge of liquid independent of viscosity thereof; and wherein the control signal causes the element to vary displacement of the variable displacement pump as a function of to speed changes of the blades.

8. A turbine in accordance with claim 7 wherein the hydraulic control valve comprises:

a valve body having a bore in which is mounted a spool which moves in response to the hydraulic signal coupled to the spool between first and second positions with the movement controlling outputting of the hydraulic control signal in response to an input of hydraulic fluid coupled to the pressurized hydraulic fluid output.

9. A turbine in accordance with claim 8 wherein the hydraulic control valve further comprises:

a plurality of lands axially spaced apart along a longitudinal axis of the spool, an input port in the bore which receives hydraulic fluid coupled to the pressurized hydraulic fluid output and an output port which outputs the hydraulic control signal with an input to the valve body being the hydraulic signal with the hydraulic signal causing the lands to move to control outputting of the hydraulic control signal.

10. A turbine in accordance with claim 9 wherein the hydraulic control valve further comprises:

a spring which biases the spool in a first position within the bore and the hydraulic signal causes the spool to move from the first position toward a second position with movement toward the second position cutting off the outputting of the hydraulic control signal from the output port.

11. A turbine in accordance with claim 10 wherein:

the turbine is a RAM air turbine in an airplane.

12. A turbine in accordance with claim 7 wherein the displacement control further comprises:

a stroking piston which is responsive to another hydraulic control signal for varying displacement of the variable displacement pump in a first rotational velocity range, and wherein the element is an anti-stall piston which varies displacement of the variable displacement hydraulic pump in a second rotational velocity range below the first rotational velocity range with the pressurized hydraulic fluid output driving a hydraulic load in the first and second rotational velocity ranges.

13. A turbine in accordance with claim 7 wherein the orifice further comprises:

a turbulence producing structure located in a flow path of the hydraulic fluid upstream of the orifice which creates turbulent flow generally perpendicular across the orifice.

14. A turbine in accordance with claim 13 wherein:

the turbulence producing structure comprises at least one flow obstructing surface extending into the flow path which faces the fluid flow.

15. A turbine in accordance with claim 14 wherein:

the turbulence producing structure comprises at least one curved surface extending into the flow path which faces the fluid flow.

16. A turbine in accordance with claim 15 wherein:

the turbulence producing structure comprises at least a partially spherical surface extending into the flow path.

17. A turbine in accordance with claim 15 wherein:

the turbulence producing structure comprises at least one rod which extends into the flow path.

18. A RAM air turbine for use in generating power in an airplane by driving a load with a RAM airstream intercepting blades of the turbine with the turbine and the turbine applying power to the load during rotation of the blades comprising:

a variable displacement hydraulic pump which is driven by rotation of the blades, including a displacement control having an element which is responsive to a hydraulic control signal for varying the displacement of the variable displacement hydraulic pump for rotational velocities of the blades, for producing a pressurized hydraulic fluid output to drive a hydraulic load; and a hydraulic control valve which generates the control signal in response to a hydraulic signal which is a function of speed changes of the blades and a pressure dropping orifice, responsive to the hydraulic signal which is a function of speed changes of the blades which bleeds the hydraulic signal to a lower pressure, the orifice producing a coefficient of discharge of liquid independent of viscosity thereof; and wherein the control signal causes the element to vary displacement of the variable displacement pump which is a function of speed changes of the blades.

19. A turbine in accordance with claim 18 wherein:

the hydraulic control is generated from a controlled flow of hydraulic fluid coupled to the pressurized hydraulic fluid output to the element.

20. A turbine in accordance with claim 19 wherein the hydraulic control valve further comprises:

a spool mounted within a bore which moves along a longitudinal axis in response to the hydraulic signal with movement of the spool controlling a rate of flow of hydraulic fluid coupled to the pressurized hydraulic fluid output.

21. A turbine in accordance with claim 20 wherein the hydraulic valve further comprises:

a plurality of lands axially spaced apart along a longitudinal axis of the spool, an input port in the bore which receives hydraulic fluid coupled to the pressurized hydraulic fluid output and an output port which outputs the hydraulic control signal with an input to the valve body being the hydraulic signal with the hydraulic signal causing the lands to move to control outputting of the hydraulic control signal.

22. A turbine in accordance with claim 21 wherein the hydraulic control valve further comprises:

a spring which biases the spool in a first position within the bore and the hydraulic signal causes the spool to move from the first position toward a second position with movement toward the second position cutting off the outputting of the hydraulic control signal from the output port.

23. A turbine in accordance with claim 18 wherein the displacement control further comprises:

a stroking piston which is responsive to another control signal for varying displacement of the variable displacement pump in a first rotational velocity range, and wherein the element is an anti-stall piston which varies displacement of the variable displacement hydraulic pump in a second rotational velocity range below the first rotational velocity range with the pressurized hydraulic fluid output driving a hydraulic load in the first and second rotational velocity ranges.

24. A turbine in accordance with claim 18 wherein the orifice further comprises:

a turbulence producing structure located in a flow path of the hydraulic fluid upstream of the orifice which creates turbulent flow generally perpendicular across the orifice.

25. A turbine in accordance with claim 24 wherein:

the turbulence producing structure comprises at least one flow obstructing surface extending into the flow path which faces the fluid flow.

26. A turbine in accordance with claim 25 wherein:

the turbulence producing structure comprises at least one curved surface extending into the flow path which faces the fluid flow.

27. A turbine in accordance with claim 26 wherein:

the turbulence producing structure comprises at least a partially spherical surface extending into the flow path.

28. A turbine in accordance with claim 26 wherein:

the turbulence producing structure comprises at least one rod which extends into the flow path.

* * * * *